Patented July 24, 1928.

1,678,381

UNITED STATES PATENT OFFICE.

THOMAS M. CRAMER, OF LONG BEACH, CALIFORNIA, ASSIGNOR TO PACIFIC COAST BORAX COMPANY, A CORPORATION OF NEVADA.

PRODUCTION OF COMMERCIAL BORAX FROM $Na_2O.2B_2O_3.4H_2O$.

No Drawing. Application filed January 12, 1927. Serial No. 160,778.

Although my present invention is entitled as referring to the production of borax, it should be understood not only that the product aimed at may be the ordinary "prismatic" borax of commerce, $Na_2O.2B_2O_3.10H_2O$, but that my present invention relates more particularly, so far as its essential novelty is concerned, to a method of producing, from a newly discovered and slowly dissolving borate which I have called "Rasorite" (containing four molecular proportions of water to one molecular proportion of $Na_2O$ and two molecular proportions of $B_2O_3$), a borax solution,—from which the ordinary prismatic borax or other borates may be obtained in a known manner.

My present invention relates, in particular, to a recently discovered naturally-occurring sodium borate whose utilization has appeared unpromising,—by reason of the fact that, although capable of ultimately dissolving in water, up to the known point of saturation of sodium borates, this new borate enters into solution, even in boiling water, at an exceedingly slow rate.

An analysis of selected specimens of the newly discovered borate has shown its composition to be $Na_2O.2B_2O_3.4H_2O$; so that this substance is seen to be one of that known series of alkali-metal borates which includes the prismatic borax of commerce (containing ten molecular proportions of water to two molecular proportions of $B_2O_3$),—another known member of this series being the so-called "octohedral" borax, $Na_2O.2B_2O_3.5H_2O$.

Particles which result from crushing Rasorite are often splinter-like in form; and, even when finely ground, they are so resistant to the solvent action of hot water as to render reliance upon usual methods of subdivision and solution unsatisfactory.

As affording a rough comparison of solution rates (all of the heretofore known sodium borates containing water of crystallization or water of combination being quickly soluble in water at 100° C., even when the introduced crystals are of a size such as $\frac{1}{4}''$ in diameter, or larger) I may mention that a crystal weighing 1.0 gram remained in water at 100° C. for 55 minutes before complete solution was effected; whereas a crystal of prismatic borax weighing 1.0 gram required but 30 seconds to effect its complete solution under like conditions; and it is accordingly an object of my invention to provide a method of producing commercial borax, or solutions thereof, from a relatively slow dissolving sodium borate such as Rasorite, by steps obviating the necessity for very fine grinding and obviating also the necessity for prolonged heating.

Although I have discovered no method which entirely obviates the use of elevated temperatures, and although the four molecular proportions of water cannot be readily removed from Rasorite by heating the same merely to a temperature slightly above 212° F., I find that a less expenditure of fuel is required during actual solution, and that fine grinding of the Rasorite is rendered unnecessary, if I subject the same even to a comparatively moderate preliminary heat treatment,—as by exposing the same in ovens, or merely on shelves or on a conveyor, to escaping flue gases, or the like, such as may be produced incidentally to the operation of a steam boiler or an equivalent apparatus utilizing fuel for any purpose whatever.

In the practice of my present invention, in preference to disposing the Rasorite upon shelves in flues or in ovens, I take Rasorite as it comes from the mines or preferably of a size to permit the same to pass a $2''$ mesh and intermittently or continuously pass the same through any heated zone,—not necessarily leaving the same therein beyond a period sufficient to permit the heat to penetrate the crystals and to drive therefrom an appreciable proportion of the water of combination,—this being found to have a disruptive effect upon the crystal structure. Subsequently to this preliminary heating, which may be regarded as an essential point of novelty in the process upon which protection is herein sought, the new mineral, its superficial appearance being somewhat altered by the mentioned heat treatment, may be quickly dissolved in hot water, or in any suitable mother liquod heated approximately to the boiling point of water; and any desired steps (as, mere filtration) may be employed for the separation of gangue or impurities from the resultant solution.

Crystallization of the desired prismatic borax may be effected by cooling in a known manner,—the strength of the solution being preferably such that no crystals appear above about 140° F. Any suitable watery medium may be used for the mentioned solvent action,—as, a hot mother liquor obtained by treating a previous batch of ore in the described manner; and the preheated ore may be introduced thereto while still hot.

It will be recognized that the described preliminary treatment aims not only at an opening up physical change in the Rasorite, rendering the same more readily soluble, but at an avoidance of fine grinding, at a minimization of expenditures for fuel, and at an economy in time; that, as a result of the described preliminary heating (in which I may employ, for example, temperatures above 240° F.) solution may be quickly effected, in the indicated manner; and that the maintenance of the mentioned concentration, during the final cooling, aims primarily to avoid the production of undesired forms of borax,—such as that which includes five molecular proportions, rather than ten molecular proportions of water to two molecular proportions of $B_2O_3$; but it should nevertheless be understood that various features of my invention might be independently employed, and also minor modifications thereof might easily be devised, by those skilled in the arts to which this case relates, without involving the slightest departure from the spirit and scope of my invention, as the same is indicated above and in the following claims.

I claim as my invention:

1. In the production of commercial borax from a naturally-occurring sodium borate which resists solution, a method which includes: subjecting said mineral to a temperature sufficient to render the mineral less resistant to solution in water, dissolving the same in a watery medium; and crystallizing a commercial borax from the resultant solution.

2. In the production of prismatic borax from a naturally-occurring sodium borate which resists solution, a method which includes: subjecting said mineral to a temperature substantially above the boiling point of water; dissolving the same in a watery medium; and crystallizing prismatic borax from the resultant solution,—the strength of said solution being kept such that no crystals appear above about 140° F.

3. A process of the general character defined in claim 1 in which said mineral is so subdivided as to pass a 2" mesh, in advance of the mentioned heating thereof.

4. A process of the general character defined in claim 1 in which the mentioned heating is affected by means of flue gases.

5. In the production of a borax solution from an alkali-metal borate which resists solution, the step which consists in heating said alkali borate to a temperature above the boiling point of water.

In testimony whereof, I have hereunto set my hand at Los Angeles, California, this 6th day of January, 1927.

THOMAS M. CRAMER.